United States Patent
Kinoshita

(10) Patent No.: US 8,438,428 B2
(45) Date of Patent: May 7, 2013

(54) TECHNIQUE FOR FAULT AVOIDANCE IN MAIL GATEWAY

(75) Inventor: Masafumi Kinoshita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 12/832,715

(22) Filed: Jul. 8, 2010

(65) Prior Publication Data
US 2011/0010588 A1    Jan. 13, 2011

(30) Foreign Application Priority Data
Jul. 9, 2009    (JP) .................................. 2009-162348

(51) Int. Cl.
G06F 11/00    (2006.01)

(52) U.S. Cl.
USPC ........................................................ 714/47.1

(58) Field of Classification Search .................. 714/47.1, 714/48
See application file for complete search history.

(56) References Cited

U.S. PATENT DOCUMENTS

| 5,889,943 | A * | 3/1999 | Ji et al. .............................. 726/22 |
| 6,732,149 | B1 | 5/2004 | Kephart |
| 2002/0174358 | A1 * | 11/2002 | Wolff et al. .................... 713/200 |
| 2003/0046558 | A1 * | 3/2003 | Teblyashkin et al. .......... 713/188 |
| 2004/0128355 | A1 * | 7/2004 | Chao et al. ..................... 709/206 |
| 2005/0120229 | A1 * | 6/2005 | Lahti .............................. 713/188 |

* cited by examiner

Primary Examiner — Scott Baderman
Assistant Examiner — Yair Leibovich
(74) Attorney, Agent, or Firm — McDermott Will & Emery LLP

(57) ABSTRACT

In a large-scale mail system such as that of a mobile phone carrier, in case that a mail gateway has encountered a fault due to a fault-inducing mail in arrival thereat, the mail gateway identifies the cause of the fault to prevent the recurrence thereof. The mail gateway is configured to include a mail relaying process used for relaying mails and a monitoring process used for supervising other processes. On occurrence of a fault due to a fault-inducing mail received by the mail relaying process, the monitoring process detects the fault-inducing mail that has cause the fault, the characteristics of the fault-inducing mail and the conditions of the fault, and then records information thus detected into a fault-inducing mail information table. After recovery from the fault under control of the monitoring process, the mail relaying process receives a new arriving mail. Upon receipt of the new arriving mail, the mail relaying process compares the characteristics thereof with relevant information recorded in the fault-inducing mail information table. If a match is found, the mail relaying process performs one of three countermeasures according to the conditions concerned; skipping over a faulty-point processing, returning an error reply to a mail transmission source, or returning a notification of non-delivery thereto.

10 Claims, 8 Drawing Sheets

F I G . 2
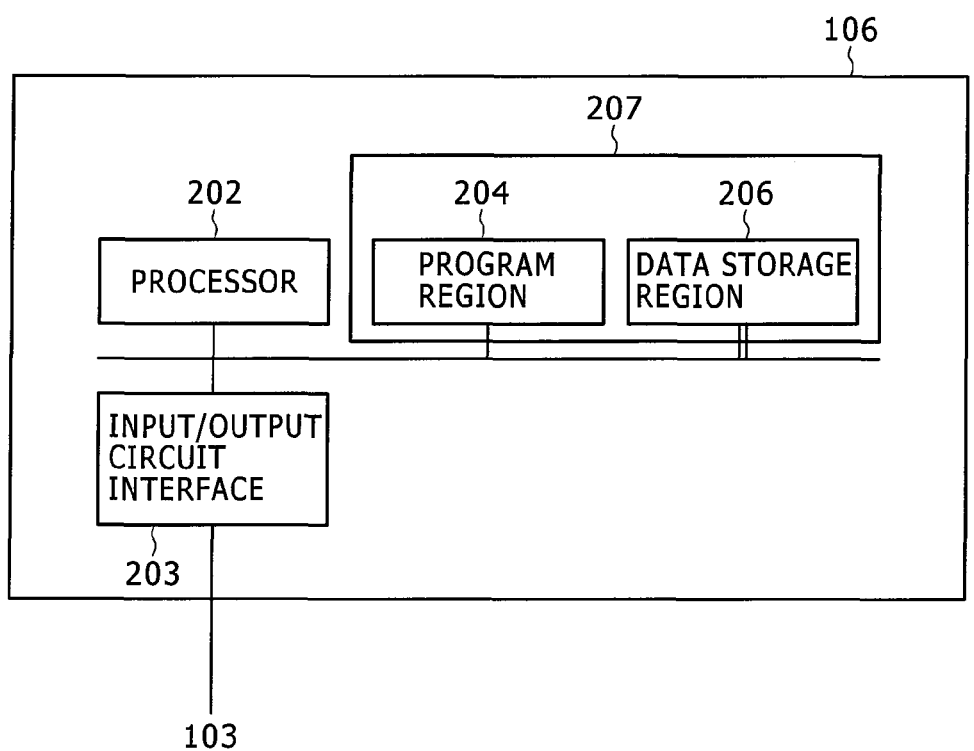

FIG. 4

| CONTROL ID 401 | OBJECT HEADER ITEM JUDGMENT INFORMATION 402 | MAIL BODY JUDGMENT INFORMATION 403 | DATE AND TIME REGISTERED 404 | TRANSMISSION SOURCE MAIL ADDRESS 405 | TRANSMISSION SOURCE SERVER 406 | DESTINATION MAIL ADDRESS 407 | SIZE (HEADER· BODY) 408 | JUDGMENT CRITERION ITEM 409 | FAULTY POINT (PROCESSING OPERATION/ PROCESS) 410 | FAULT-INDUCING MAIL RECEPTION COUNT 411 |
|---|---|---|---|---|---|---|---|---|---|---|
| 001 | ?????? | - | ····· | x1@xxxx | x.x.x.21 | xx@sss | 1024· 4096 | HEADER | HEADER FILTERING/MAIL RELAYING PROCESS | 1 |
| 002 | ?????? | ?????? | ····· | x2@xxxx | COMMUNI-CATION TERMINAL | xx@sss | 512· 3330 | HEADER· BODY | TRANSCODING/ MAIL RELAYING PROCESS | 1 |
| 003 | - | ?????? | ····· | x3@xxxx | x.x.x.23 | xx@sss | 512· 80000123 | BODY SIZE· BODY | IMAGE CONVERSION/ COMMUNICATION-WITH-DIFFERENT-SERVER PROCESS | 1 |

321

TECHNIQUE FOR FAULT AVOIDANCE IN MAIL GATEWAY

INCORPORATION BY REFERENCE

This application claims priority based on a Japanese patent application, No. 2009-162348 filed on Jul. 9, 2009, the entire contents of which are incorporated herein by reference.

BACKGROUND

The present invention relates to a technique for avoiding the occurrence of a fault in a mail gateway.

Nowadays, in communication by electronic mail (hereinafter referred to simply as mail), so-called spam mails unsolicited by recipients are transmitted in large quantity, emerging as a social issue concerning the Internet. (The term "spam mail" as used herein has the above definition, though varying depending on literature.) Communication common carriers managing mail servers such as Internet service providers (hereinafter referred to just as communication carriers) have been taking various measures for preventing the distribution of spam mails, e.g., spam mail filtering as a typical anti-spam provision.

An example of spam mail filtering is disclosed in U.S. Pat. No. 6,732,149. According to the disclosure contained in U.S. Pat. No. 6,732,149, there is described a technique wherein, in a first phase, a specific mail is determined to be an undesirable spam mail according to alert signaling from a user, and in a second phase, based on resultant data, it is detected whether each subsequent mail received is a spam mail or a variant thereof. Thus, mails that have been judged to be spam mails are filtered out to hinder undesirable reception or transmission of spam mails.

Besides the technique disclosed in U.S. Pat. No. 6,732,149, there are a variety of anti-spam techniques; for example, a technique for detecting peculiar characteristics of spam mails through machine learning, a technique for registering user-detected characteristics of spam mails into a database, and a technique for checking mails by calculating similarities to common-type spam mails or probabilities of spamming.

SUMMARY

It is to be noted here that mail servers of communication carriers are also adversely affected by some kinds of mails other than spam mails. Described below is an exemplary case of a mail system of a communication carrier providing mobile phone service (mobile phone carrier).

In mail service unique to mobile phone communication, a mobile phone carrier's mail system delivers mails through various conversion processings of character codes, pictographic characters, and attached image data therein. These mail system processings are implemented by a server called a mail gateway, in which there is a possibility that a fault such as a process-down event may occur in the course of processing a mail prepared in an unpredictable fashion.

In a network of a mobile phone carrier (carrier facility network), a plurality of gateways such as that mentioned above are installed for providing load distribution. In a situation where a mail that will induce a fault (hereinafter referred to as a fault-inducing mail) is retransmitted or fault-inducing mails are transmitted in large quantity through a mail gateway, a fault may occur in other mail gateways in succession to cause the shutdown of all the mail gateways in the worst case, resulting in the outage of mail service.

For precluding fault-inducing mails at a mail gateway, there may be applied spam mail filtering such as the technique disclosed in U.S. Pat. No. 6,732,149. However, a judgment procedure in the conventional spam mail filtering is based on the precondition that the characteristics of spam mails are detected by persons or through machine learning with pre-assigned information. That is, in the use of the conventional spam mail filtering technique, it takes a considerably long period of time from the moment when a mail gateway has encountered a fault due to a fault-inducing mail until the moment when the characteristics of the fault-inducing mail that has caused the fault are obtained. In an instance where the same fault-inducing mail is retransmitted or identical fault-inducing mails are transmitted in large quantity during the long period of time mentioned above, it is impossible to avoid the outage of mail service.

Some fault-inducing mails, unlike common-type spam mails, may be non-malicious mails to be received as normal mails that are welcome to recipients, though being mails that should be filtered out from the standpoint of a mobile phone carrier's mail system. The conventional spam mail filtering technique is not applicable as a solution to this situation since non-malicious mails having suspicious characteristics are also filtered out in principle even if these mails are welcome to recipients.

The disclosed system provides a technique for fault avoidance in a mail gateway (mail server) wherein, when the mail gateway has encountered a fault due to a fault-inducing mail received thereby, the mail gateway immediately identifies the fault-inducing mail corresponding to the cause of the fault and detects the characteristics of the fault-inducing mail. Further, the disclosed system provides another technique for fault avoidance in the mail gateway wherein the mail gateway carries out fault-inducing mail analysis by using information regarding mail characteristics detected, and based on the result of the analysis, the mail gateway selects a proper countermeasure in a fashion that suspicious mails will not be precluded wherever possible.

The disclosed mail gateway includes a mail relaying process in charge of mail relaying operations; and a monitoring process for supervising the mail relaying process. The mail relaying process is arranged to have algorithmic mechanisms for identifying a mail being processed at the time of occurrence of a fault such as a process-down event.

In the event of a fault, the monitoring process identifies a fault-inducing mail that has cause the fault, and acquires the characteristics of the fault-inducing mail through analysis thereof. Further, the monitoring process acquires information regarding a faulty process corresponding to the occurrence of the fault and processing conditions thereof. Then, the monitoring process registers the information thus acquired into an information table designed for recording fault-inducing mail information (hereinafter referred to as a fault-inducing mail information table). Thereafter, the monitoring process performs a fault recovery procedure for the mail relaying process. It is also preferable that the monitoring process should transfer the above fault-related information acquired to each of the other mail gateways installed in the carrier facility network.

For a new arriving mail to be handled after the event of the fault mentioned above, the mail relaying process checks the characteristics of the new mail in arrival against the fault-inducing mail information table. If a match with an entry recorded in the fault-inducing mail information table is found, the new mail in arrival is judged to be a fault-inducing mail. Then, in the mail gateway, a proper countermeasure is taken so as not to preclude the mail that has been judged to be a fault-inducing mail wherever possible, i.e., according to the conditions concerned, the mail relaying process selects one of a plurality of countermeasures, such as skipping over a processing that is likely to encounter a fault, or notifying a user of information regarding a suspected fault.

According to the teaching herein, it is possible to prevent the recurrence of a fault due to a specific mail that has arrived at a mail gateway, thereby ensuring continuous service of a mail system.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 illustrates a configuration of a mail gateway according to a embodiment;

FIG. 4 illustrates the contents of a fault-inducing mail information table;

DETAILED DESCRIPTION OF THE EMBODIMENTS

First, the definition of the term "fault-inducing mail" as used in the present specification and in the appended claims is given here. A fault-inducing mail is a kind of mail that will cause a faulty condition as mentioned below. On receipt of a mail, a mail gateway proceeds to a particular processing operation, in which there may occur a process-down event or a faulty condition under which an excessive amount of time is required for accomplishing the particular processing operation to cause an adverse effect on any other processing (hereinafter referred to as a "fault"). In most cases, a fault-inducing mail is an RFC-noncompliant mail prepared in a fashion unpredictable by the mail gateway. In other cases, a fault-inducing mail may be an apparently normal mail or non-malicious mail that will cause a fault in program execution in the mail gateway.

It is to be noted that a mail gateway configured in a conventional arrangement cannot detect such a fault-inducing mail as defined above until a fault is encountered in actual processing thereof in the gateway. That is, unlike a common type of spam mail, a fault-inducing mail mentioned herein has neither any particular feature predicting the occurrence of a possible fault nor any algorithmic information detectable for predicting the occurrence thereof.

Further, while a spam mail filter is designed to judge whether a mail itself is a spam mail or not, the disclosed system is intended to embody an arrangement wherein, instead of forming a judgment on whether a mail itself is a spam mail, a mail gateway examines whether a mail is potentially detrimental to cause a fault therein, and then based on the result obtained through the examination, the mail gateway changes processing execution so as to avoid a fault therein.

An example will now be described in detail by way of example with reference to the accompanying drawings.

Figure 1:
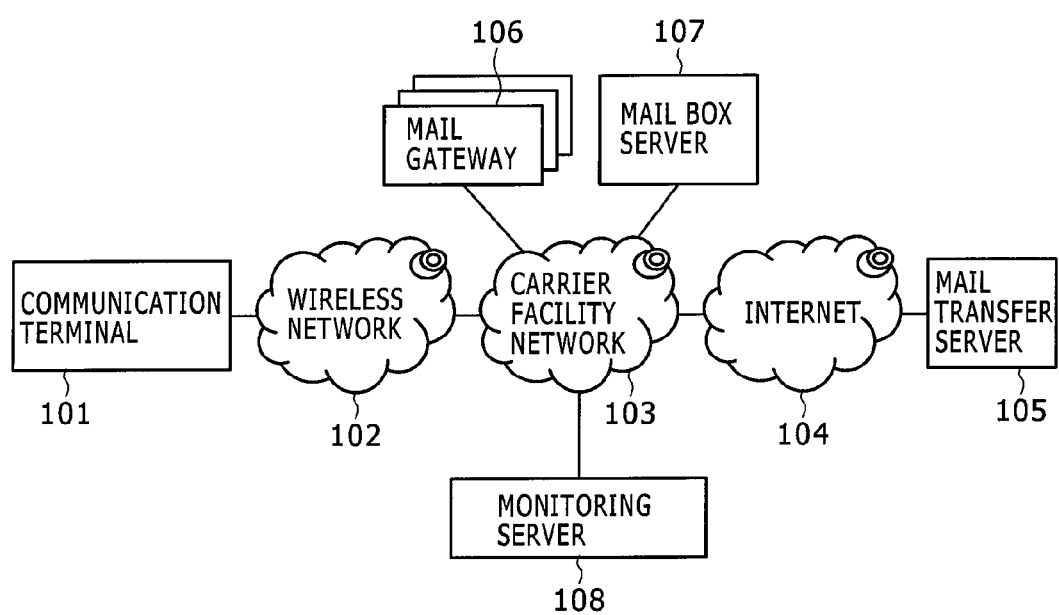
FIG. 1 illustrates a configuration of a communication system according to a embodiment.

Referring to FIG. 1, there is shown an exemplary configuration of a communication system according to a embodiment.

In FIG. 1, reference numeral 101 indicates a communication terminal, reference numeral 102 indicates a wireless network, reference numeral 103 indicates a carrier facility network, reference numeral 104 indicates an intercommunication network such as the Internet, reference numeral 105 indicates a mail transfer server, reference numeral 106 indicates a mail gateway, reference numeral 107 indicates a mailbox server, and reference numeral 108 indicates a monitoring server.

The communication terminal 101 is representative of a mobile phone terminal or a terminal capable of data communication such as a personal computer (PC), and the communication terminal 101 is coupled to the carrier facility network 103 via the wireless network 102. The wireless network 102 is provided as a wireless network placed under the management of a mobile phone carrier. The carrier facility network 103 is provided as a network or a network facility for relaying mails from the wireless network 102 to the Internet 104, the mail gateway 106, and the mailbox server 107. The wireless network 102 and the carrier facility network 103 are operated under the management of the mobile phone carrier that manages the mail gateway 106 according to the embodiment.

The mail transfer server 105 is also referred to as a message transfer agent (MTA), which performs mail transmission to and reception from the mail gateway 106 through the Internet 104. More specifically, the mail transfer server 105 transfers mails from a different mobile phone carrier managing the mail transfer server 105 or mails from a different service provider to the mail gateway 106, and also the mail transfer server 105 relays mails from the gateway 106 to the different mobile phone carrier or the different service provider.

The mail gateway 106 is installed in the carrier facility network 103. A mail sent from the communication terminal 101 or the mail transfer server 105 to the carrier facility network 103 is received by the mail gateway 106. If the destination of the mail is located within the carrier facility network 103, the mail gateway 106 relays the mail to the mailbox server 107. Alternatively, if the destination of the mail is located outside the carrier facility network 103 (i.e., the destination of the mail is located within a different mobile phone carrier or a different service provider), the mail gateway 106 relays the mail to the mail transfer server 105.

Note that, in the embodiment, a combination of the communication terminal 101 and the mail transfer server 105 is represented as a mail client 110 in cases where each thereof is regarded as a mail transmission source viewed from the mail gateway 106. Further, a combination of the mail transfer server 105 and the mailbox server 107 is represented as a destination mail server in cases where each thereof is regarded as a mail relay point, and a combination of the mail gateway 106 and the mailbox server 107 is represented as a mail receiving server in cases where each thereof is regard as a server for receiving from mails from the mail client 110.

It is also to be noted that the mail gateway 106 comprises a plurality of servers for the purpose of load distribution in the embodiment. A reference numeral suffixed with a lower-case letter, e.g., "106a", is used to indicate a particular one of the mail gateway servers, and a reference numeral without a suffix letter is used where no particular mail gateway server is specified.

In the embodiment, it is assumed that the communication protocol SMTP (Simple Mail Transfer Protocol) or ESMTP (Extended SMTP) is adopted for communication between the mail gateway 106 and the communication terminal 101 and for communication between the mail gateway 106 and the mail transfer server 105. It is also assumed that the communication protocol LMTP (Local Mail Transfer Protocol) is adopted for communication between the mail gateway 106 and the mailbox server 107. Besides, other communication protocols such as HTTP (Hypertext Transfer Protocol), IMAP (Internet Message Access Protocol), POP (Post Office Protocol), and MMS (Multimedia Messaging Service) are also applicable.

The mailbox server 107, which is installed in the carrier facility network 103, stores mails destined for the communication terminal 101 and delivers the stored mails to the communication terminal 101. In a large-scale mail system such as that of a mobile phone carrier, the mailbox server 107 comprises a plurality of server units for storing a large amount of mail. In the embodiment, however, a single mailbox server is exemplified for the sake of simplicity in description. While no limitation is imposed on a protocol used for communication between the communication terminal 101 and the mailbox server 107 in the embodiment, a protocol such as the IMAP, POP, or MMS is recommendable in practical application for communication between the communication terminal 101 and the mailbox server 107.

The monitoring server 108 is provided for supervising the mail gateway 106 and the mailbox server 107 by receiving alert information regarding a faulty condition or the like from the mail gateway 106 and the mailbox server 107.

Referring to FIG. 2, there is shown a configuration of information processing hardware for implementing the mail gateway 106.

The information processing hardware for implementing the mail gateway 106 includes a processor 202, a storage unit 207, an input/output circuit interface 203 for data transmission to and reception from the carrier facility network 103, and internal communication lines such as bus lines for coupling thereof.

The storage unit 207, which is provided as an external storage device such as a semiconductor memory device or a hard disk unit, has a program region 204 and a data storage region 206. The program region 204 is used to store programs for implementing processes that provide functions of the mail gateway 106, and the programs stored therein are carried out under control of the processor 202. The programs may be prestored in the program region 204, or may be loaded onto the program region 204 through use of a removable storage medium or a communication medium, i.e., a network, and digital signals/carrier waves propagating therethrough (not shown). The data storage region 206 is used to store information other than that stored in the program region 204, e.g., log data output from the programs.

Figure 3:
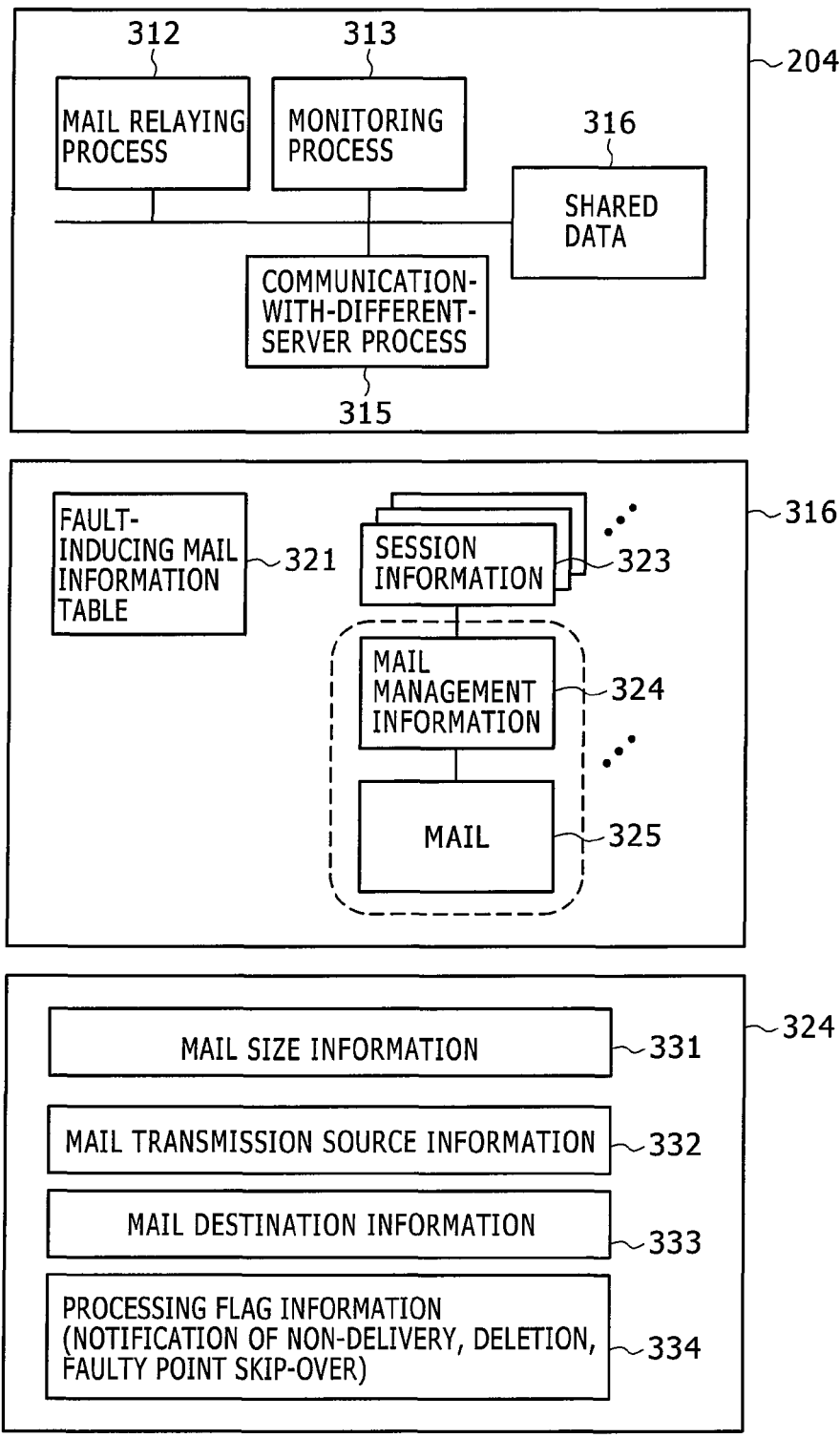
FIG. 3 illustrates a structure of a set of programs in the mail gateway.

Referring to FIG. 3, there is shown a structure of a set of programs stored in the program region 204 for implementing processes in the mail gateway 106.

The set of programs in the mail gateway 106 includes a program for implementing a mail relaying process 312 (referred to just as a mail relaying process 312 for the sake of convenience in description; similar wording is applied hereinafter), a monitoring process 313, a communication-with-different-server process 315, and shared data 316. The mail relaying process 312 is in charge of mail relaying operations. The monitoring process 313 is used to supervise other processes and is in charge of performing detection of a fault in other processes and taking a countermeasure on detection of a fault. The communication-with-different-server process 315 is in charge of communication with other mail gateways 106 arranged in N dispersion. Note that each of the above processes may be implemented in the form of a thread that is a smaller unit executable in parallel processing in program execution.

As the shared data 316, data to be processed by each process is stored in such a fashion that the data can be accessed from any of the processes. The shared data 316 is arranged to include a fault-inducing mail information table 321, a queue 322, session information 323, mail management information 324, and mails 325.

The fault-inducing mail information table 321 is used for storing information regarding mails that have been judged to be fault-inducing mails. The details of this table will be described later with reference to FIG. 4.

The session information 323 contains information for managing sessions of communication with the mail client 110 and a destination mail server and for carrying out mail relaying operations. The mail relaying process 312 selects one of a plurality of pieces of session information 323 at the time of carrying out a relevant mail relaying operation.

The number of pieces of existent session information 323 corresponds to the number of mail reception/transmission processing operations that are currently carried out by the mail relaying process 312.

The mail management information 324 contains information for mail relaying to be conducted by the mail relaying process 312. The number of pieces of mail management information 324 corresponds to the number of mails 325 on a one-to-one basis.

The mail management information 324 is configured to include mail size information 331, mail transmission source information 332, mail destination information 333, and processing flag information 334. The mail size information 331 contains information regarding the sizes of the header and body of mail 325. The mail transmission source information 332 contains a mail address of a transmission source of mail 325 and information regarding a communication terminal/server that is the source of transmission of mail 325. The mail destination information 333 contains a destination mail address of mail 325. The processing flag information 334 contains information for controlling processing operations to be performed by the mail relaying process 312. In accordance with the processing flag information 334, the mail relaying process 312 carries out a special sequence of processing, e.g., deletion of mail 325, continuation of mail relaying while skipping over a faulty point, or transmission of notification of non-delivery (to be described in detail later).

Referring to FIG. 4, there is presented an explanatory diagram showing an exemplary structure of the fault-inducing mail information table 321.

The fault-inducing mail information table 321 is provided for extracting the characteristics of a mail that has been judged to be a fault-inducing mail, for storing the characteristics extracted, and for forming a judgment on whether each of the subsequent mails to be processed is a fault-inducing mail or not (the details of judgment will be described later).

The characteristics to be extracted from each mail may be a partial character string or the entire character string contained in the mail. Alternatively, the characteristics thereof may be extracted as a hash value calculated from an object mail portion by using a hash function, for example.

The fault-inducing mail information table 321 is configured to have the following entry items; control ID 401, object header item judgment information 402, mail body judgment information 403, date and time registered 404, transmission source mail address 405, transmission source server ID information 406, destination mail address 407, size 408, judgment criterion item 409, faulty point 410, and fault-inducing mail reception count 411.

The control ID 401 is an identifier to be assigned to each entry for management of the fault-inducing mail information table 321. Data is stored for each entry in the fault-inducing mail information table 321. The details of registration of entry information into the fault-inducing mail information table 321 in the mail gateway 106 will be described later. Presented below are the descriptions of each of the entry items of the fault-inducing mail information table 321.

The object header item judgment information 402 is mail header information to be used for fault-inducing mail judgment by the mail gateway 106. The term "object header item" as used herein indicates an item in the header of a mail in arrival or an item in a MIME header of a mail body to be subjected to such processing as deletion, addition, or rewriting by the mail gateway 106. (A processing operation such as deletion, addition, or rewriting of a mail header item is hereinafter referred to as "header filtering".) In the object header item judgment information 402, there is contained information regarding the characteristics of an object header item of a mail that has caused a fault in processing by the mail gateway 106.

In some cases, a MIME header of a mail body is contained in the object header item judgment information 402 since the MIME header is used for inclusion of such an attached file as an HTML data attachment or an image file in the mail body. In mail header processing for mail attachment analysis, the mail gateway 106 can thus analyze the MIME header of the mail body by using the object header item judgment information 402.

The mail body judgment information 403 is mail body information to be used for fault-inducing mail judgment by the mail gateway 106. Regarding the mail body judgment information 403, it is allowed to specify, as a mail body, a MIME region unit delimited by a MIME header. The mail body judgment information 403 is provided separately from the object header item judgment information 402 since mail body processing and mail header processing are performed independently in the mail gateway 106 for examinations of different kinds of faults that have different adverse effects on the communication system concerned.

The item of date and time registered 404 indicates the date and time when the entry concerned was registered in the fault-inducing mail information table 321 by the mail gateway 106. Using the item of date and time registered 404 as the starting point of time, the mail gateway 106 judges whether the entered information is valid or not according to the lapse of a predetermined period of validity. Further, if the entry count exceeds the maximum registrable number of entries in the fault-inducing mail information table 321, the mail gateway 106 deletes excess entries in chronological order of date and time registered 404.

The transmission source mail address 405 indicates a mail address of the mail client 110.

The transmission source server 406 indicates a host name or IP address of a transmission source server of a mail received by the mail gateway 106. In an instance where the mail client 110 is the communication terminal 101, the item of transmission source server 406 is not used in the fault-inducing mail information table 321.

The destination mail address 407 indicates a mail address of destination of transmission. In cases where a plurality of destinations are specified, a plurality of relevant mail addresses are stored in the fault-inducing mail information table 321.

The size 408 indicates a value of the size of each of the header and body of a fault-inducing mail.

The judgment criterion item 409 indicates which information should be used for or which combination of information should be used for fault-inducing mail judgment. For example, if the mail gateway 106 has encountered a fault in the course of mail header processing therein, the mail gateway 106 registers "Header" as the judgment criterion item 409 so that a fault-inducing mail judgment can be formed by using the object header item judgment information 402. Alternatively, if the mail gateway 106 has encountered a fault in the course of mail body processing therein, the mail gateway 106 registers "Body" as the judgment criterion item 409 so that a fault-inducing mail judgment can be formed by using the mail body judgment information 403.

Likewise, as the judgment criterion item 409, "Body size" or "Header size" may be registered to indicate that a fault-inducing mail judgment is to be formed by using the size 408 corresponding to the cause of the fault concerned. If a fault is encountered in both mail header processing and mail body processing in the mail gateway 106 or if it is not known whether a fault has occurred in mail header processing or mail body processing, the mail gateway 106 registers both "Header" and "Body" as the judgment criterion items 409. That is, as the judgment criterion items 409, "Header/Header size" and/or "Body/Body size" may be recorded in the fault-inducing mail information table 321.

As the faulty point 410, a processing operation and a process (function) corresponding to the occurrence of a fault are registered in the fault-inducing message information table 321. The faulty point 410 is used in a case where the mail gateway 106 continuously performs mail relaying while skipping over a faulty point for transmission of a mail that has been judged to be a fault-inducing mail by the mail gateway 106. The faulty point 410 may indicate a faulty point corresponding to a plurality of processing operations or a plurality of faulty points if it is not known which processing operation has encountered a fault.

The character strings exemplified at the items 409 and 410 in FIG. 4 may be registered as numeric values (ID numbers) predefined in the mail gateway 106 in practical application. For example, at the item 409, "Header" and "Body" may be registered as "1" and "2", respectively, according to predefinitions thereof in the mail gateway 106.

The fault-inducing mail reception count 411 indicates the number of received mails matching the entry concerned.

Figure 5:
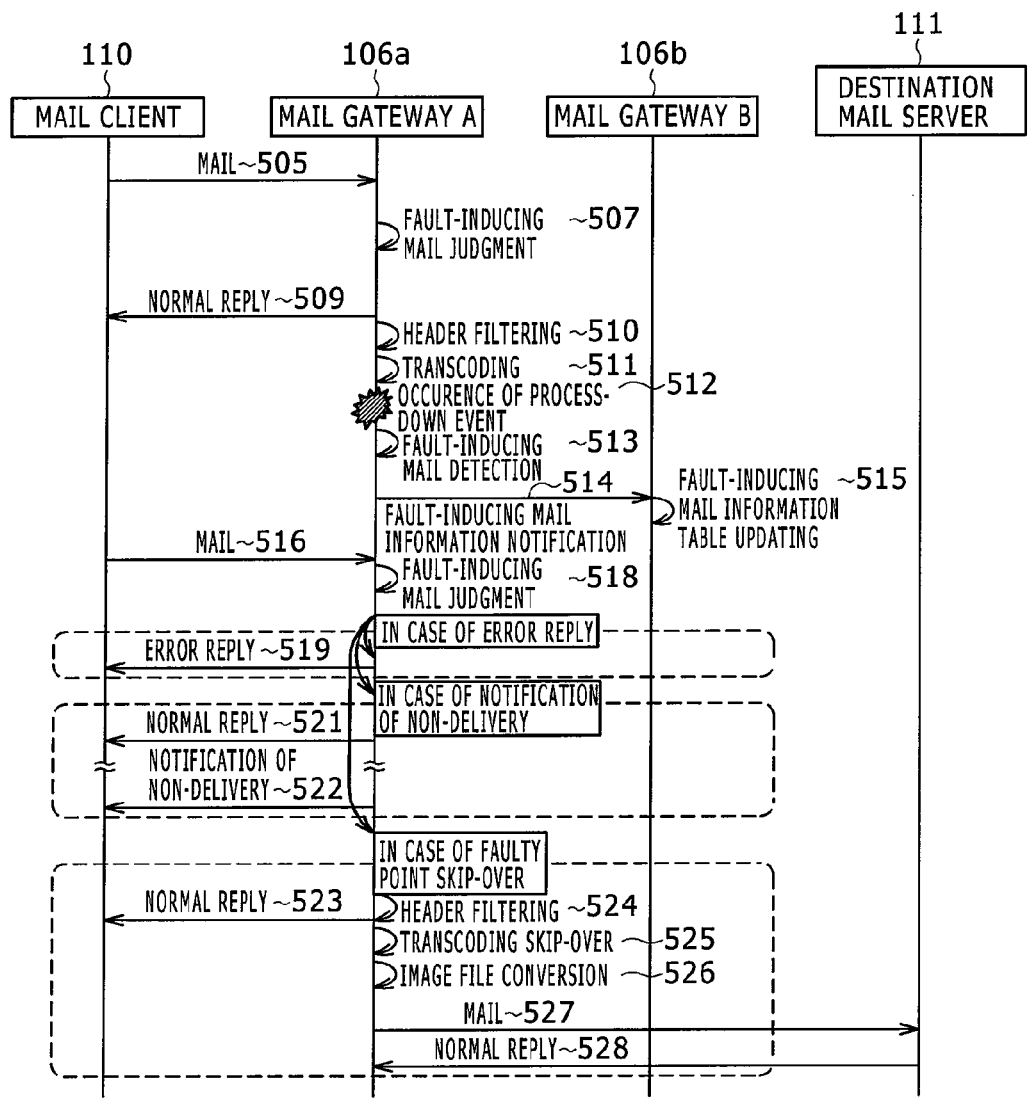
FIG. 5 illustrates a mail relaying sequence to be taken on occurrence of a fault in the mail gateway.

FIG. 5 is a diagram illustrating a mail relaying sequence to be taken on occurrence of a fault in the mail gateway 106. In FIG. 5, there is shown an exemplary sequence wherein a fault is encountered during execution of relaying operation for a mail received by the mail gateway 106 from the mail client 110.

In the exemplary sequence shown in FIG. 5, a mail gateway A 106*a* and a mail gateway B 106*b* are servers included in the mail gateway 106 that comprises a plurality of servers for the purpose of load distribution. Of all the steps to be performed by the mail gateway A 106*a*, only the step of fault-inducing mail detection 513 is carried out by the monitoring process 313. The other steps are carried out by the mail relaying process 312.

First, the mail client 110 sends a mail 505 to the mail gateway A 106*a*. Upon receiving the mail 505, the mail gateway A 106*a* proceeds to fault-inducing mail judgment processing 507 (judgment on fault potentiality of mail). Since a fault has not yet occurred at the time point of execution of the fault-inducing mail judgment 507, the mail gateway 106 does not extract the characteristics of the mail 505 (to be described in detail later with reference to FIG. 6).

Then, to the mail client 110, the mail gateway A 106a returns a normal reply 509 indicating that the mail 505 has been received normally.

Then, the mail gateway A 106a performs header filtering processing 510 as aforementioned. In the header filtering processing 510, the mail gateway A 106a performs deletion, addition, or rewriting of a header item of the mail 505.

Then, the mail gateway A 106a proceeds to transcoding processing 511. In the embodiment, the term "transcoding" is defined as code conversion of characters (including pictographic characters) contained in the subject field or body of a mail. Note that conversion of image data, audio data or moving picture data attached to a mail is not included in the term "transcoding" used herein. (Conversion of an image file attached to a mail is performed in step 526.) In the transcoding processing 511, the mail gateway A 106a carries out code conversion of characters (including pictographic characters) contained mainly in the body of the mail 505.

It is assumed here that a process-down event 512 has occurred during execution of the transcoding processing 511 in the mail relaying process 312 in the mail gateway A 106a. In this situation, the mail gateway A 106a carries out fault-inducing mail detection processing 513. In the fault-inducing mail detection processing 513, a mail that has caused a fault in the mail gateway A 106a is identified and the characteristics thereof are extracted. Then, relevant information is registered into the fault-inducing mail information table 321, and a processing operation for recovery from the fault is performed (to be described in detail later with reference to FIG. 8). Through execution of the fault-inducing mail detection processing 513, the mail gateway 106 performs fault-inducing mail judgment 518. For the sake of simplicity in explanation, fault-inducing mail judgment 518 is not detailed here; the details thereof will be presented later in the description of step 518.

Then, the mail gateway A 106a sends a fault-inducing mail information notification 514 to the mail gateway B 106b. Through the processing of fault-inducing mail information notification 514, information regarding a mail that has caused a fault is provided to another mail gateway server 106 installed for the purpose of load distribution. It is preferable to provide this information to each of the remaining mail gateway servers 106.

Upon receiving the fault-inducing mail information notification 514, the mail gateway B 106b performs fault-inducing mail information table updating 515.

It is to be noted that the processing of fault-inducing mail information notification 514 may also be implemented by providing such an arrangement that the mail gateway A 106a registers the fault-inducing mail information notification 514 into a database (DB) server or the like and another mail gateway 106 acquires fault-inducing mail information from the DB server.

In cases where only one mail gateway server 106 is provided, it is not necessary to take the steps of fault-inducing mail information notification 514 and fault-inducing mail information table updating 515.

In the subsequent steps 516 to 528, it is assumed that the mail client 110 sends a mail 516 equivalent to the mail 505 to the mail gateway A 106a or B 106b. Upon receiving the mail 516, the mail gateway A 106a proceeds to fault-inducing mail judgment processing 518. In the fault-inducing mail judgment processing 518, the mail gateway A 106a judges whether the characteristics of the mail 516 match those of any entry registered in the fault-inducing mail information table 321. If a match is found, the mail gateway A 106a carries out countermeasure processing according to the result of the judgment. When the mail gateway A 106a judges that the mail 516 is a fault-inducing mail, the mail gateway A 106a selects one of the following three countermeasures; error reply (step 519), notification of non-delivery (steps 521, 522), and faulty point skip-over (steps 523 to 528); in the embodiment (to be described in detail later with reference to FIG. 7).

In a case where "Error reply" is selected in the fault-inducing mail judgment 518, the mail gateway A 106a returns an error reply 519 to the mail client 110 in response to the mail 516. As the error reply 519, an "irreparable error" message, corresponding to a 500-series error code in SMTP for example, is sent to the mail client 110.

In a case where "Notification of non-delivery" is selected in the fault-inducing mail judgment 518, the mail gateway A 106a returns a normal reply 521 to the mail client 110 in response to the mail 516. Then, the mail gateway A 106a sets up a coupling different from that for the normal reply 521, i.e., the mail gateway A 106a sets up a new coupling to the mail client 110. Thereafter, a notification of non-delivery 522 is sent to the client 110. The notification of non-delivery 522 is provided in the form of mail, and in the mail body thereof, there is contained an error condition described in a fashion understandable by a user of the mail client 110. Further, although not shown in FIG. 5, a notification of non-delivery may be sent to a destination mail server 111, depending on the faulty condition concerned.

When each processing of error reply (step 519) and notification of non-delivery (steps 521, 522) is completed, the mail concerned is deleted, though not shown in FIG. 5. At the time of deletion of the mail, information thereof is stored into the data storage region 206 as log data.

In a case where "Faulty point skip-over" is selected in the fault-inducing mail judgment 518, the mail gateway A 106a returns a normal reply 523 to the mail client 110, and proceeds to header filtering processing 524. Then, the mail gateway A 106a performs a transcoding skip-over 525 for skipping over a transcoding operation that corresponds to a faulty point. In step 525, an error condition, i.e., a statement saying that transcoding has not been performed, in the present example, may be described in the body of a mail 527. The mail gateway A 106a then proceeds to image file conversion processing 526. Thereafter, the mail gateway A 106a sends the mail 527 to the destination mail server 111, and receives a normal reply 528. Note that, while the mail gateway 106 performs each processing of header filtering 524 (equivalent to step 510), transcoding skip-over 525, and image file conversion 526 to carry out mail relaying in the embodiment, there may be provided a modified arrangement in which other processing operations are performed between steps 524 and 526.

Figure 6:
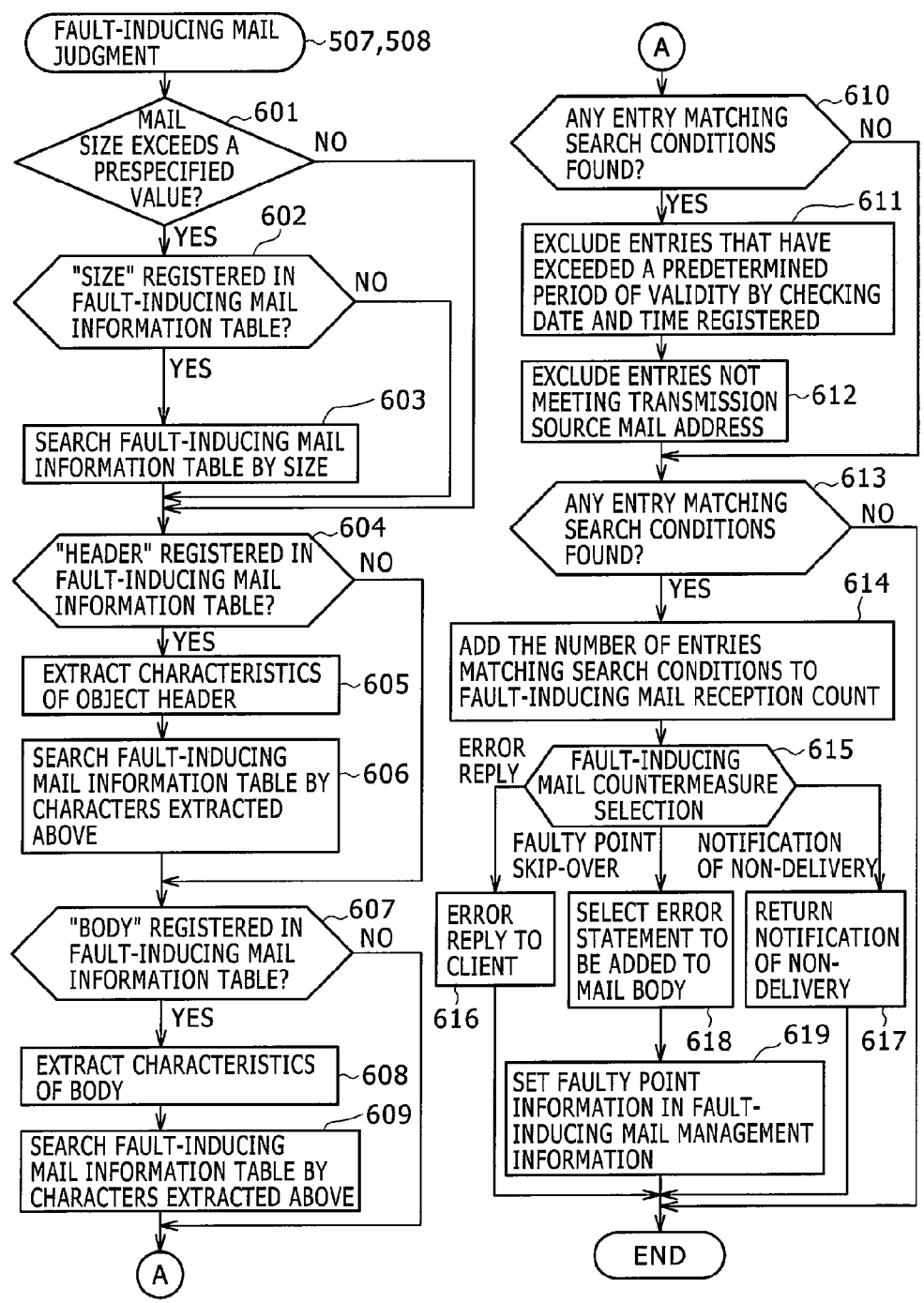
FIG. 6 illustrates a processing flow for fault-inducing mail judgment in the mail gateway.

Referring to FIG. 6, there is shown a flowchart of the fault-inducing mail judgment processing 507/518.

In the fault-inducing mail judgment processing (step 507/518), upon receipt of a mail, the mail gateway 106 judges whether the mail received is equivalent to a fault-inducing mail that has caused a fault previously, and if necessary, the mail gateway 106 takes a proper procedure for preventing the recurrence of the same kind of fault. The fault-inducing mail judgment is carried out by the mail relaying process 312. First, in execution of the fault-inducing mail judgment, the judgment criterion item 409 of the fault-inducing mail information table 321 is checked using each search key of "Size", "Header" and "Body" to examine whether fault-inducing mail entries are registered in the fault-inducing mail information table 321. If any entry is found, characteristics are extracted with respect to the relevant processing item. For example, if "Header" is found, a processing operation for extracting the characteristics of the relevant header of the mail received is called into execution. That is, if no entry is registered in the fault-inducing mail information table 321, the mail gateway 106 does not perform mail characteristic extraction processing. In the mail characteristic extraction processing in the mail gateway 106, a partial character string or the entire character string may be extracted from the mail concerned. Alternatively, the characteristics thereof may be extracted as a hash value calculated from an object mail portion by using a hash function. The general flow in FIG. 6 is taken as mentioned above in execution of the fault-inducing mail judgment processing. The following will then describe the details of the fault-inducing mail judgment processing.

In step 610, it is checked whether the size of the mail concerned (mail header size or mail body size) exceeds a prespecified value (hereinafter referred to as a size threshold value). The term "size threshold value" as used herein indicates a prespecified limit value representing a mail header or body size that is allowable for mail relaying by the mail gateway 106 in most cases.

In the fault-inducing mail information table 321, an entry having "Size" recorded at the judgment criterion item 409 indicates a condition where the relevant size threshold value is exceeded. In the searching of the fault-inducing mail information table 321, the efficiency with the use of a search key "Body size" is higher than that with the use of another search "Header" or "Body".

Hence, in step 601, the mail gateway 106 checks whether the size threshold value is exceeded or not. Thereafter, in step 604, "Header" is used as a search key, and then in step 607, "Body" is used as a search key.

If it is found in step 601 that the size of the mail concerned exceeds the size threshold value, program control goes to step 602. If it is found that the size of the mail concerned does not exceed the size threshold value, program control goes to step 604. In step 602, it is checked whether "Size" is registered at the judgment criterion item 409 in the fault-inducing mail information table 321. If "Size" is registered in the fault-inducing mail information table 321, program control goes to step 603. In step 603, the fault-inducing mail information table 321 is searched using "Size" as a key. As the result of the search, any entry meeting the specified condition of the judgment criterion item 409 is recorded, and then program control goes to step 604.

In step 604, it is checked whether "Header" is registered at the judgment criterion item 409 in the fault-inducing mail information table 321. If "Header" is registered in the fault-inducing mail information table 321, program control goes to step 605. Alternatively, if "Header" is not registered in the fault-inducing mail information table 321, program control goes to step 607. In step 605, the characteristics of the header concerned are extracted.

In the fault-inducing mail information table 321, management is conducted regarding the number of criterion records registered at the judgment criterion item 409, i.e., the number of records of individual criteria such as "Header", "Body", "Header size", and "Body size". In step 602, if the value of the judgment criterion item 409 in the fault-inducing mail information table 321 is zero, it is judged that no relevant criterion record is registered therein. Likewise, in each of steps 604 and 607, it is also checked whether or not the number of relevant criterion records is zero at the judgment criterion item 409 in the fault-inducing mail information table 321.

In step 605, the characteristics of an object header item to be processed by the mail gateway 106 are extracted. A mail header contains a "Date" header item indicating the date/time transmitted, a "Received" header item indicating a server in charge of mail relaying, and a "Message-Id" item indicating an ID number unique to each mail. Since these header items vary on an each-time basis of transmission from the mail client 110 and also these header items are not processed by the mail gateway 106, these header items are not included in object header data in step 605. If a header item variable on an each-time basis of transmission is inclusively used as a matching condition in the mail gateway 106, there arises a possibility that a fault may recur due to false checking in fault-inducing mail judgment.

In the header filtering processing in the mail gateway 106, a header item prespecified in a setup file for the mail gateway 106 is subjected to filtering. Hence, if a faulty point is in the header filtering processing, the mail gateway 106 extracts the characteristics of the header item specified in the setup file. In step 606, the fault-inducing mail information table 321 is searched using the characteristics of the object header item as key information.

In step 607, it is checked whether "Body" is registered at the judgment criterion item 409 in the fault-inducing mail information table 321. If "Body" is registered in the fault-inducing mail information table 321, program control goes to step 608. Alternatively, if "Body" is not registered in the fault-inducing mail information table 321, program control goes to step 610. In step 608, the characteristics of a mail body are extracted. In step 609, the fault-inducing mail information table 321 is searched using the characteristics of the mail body concerned as key information.

In step 610, it is checked whether any entry matching the search conditions is indicated in the results of searching of the fault-inducing mail information table 321 at steps 603, 606 and 609. If no entry matching the search conditions is indicated, it is judged that the mail concerned is not a fault-inducing mail. Thus, the fault-inducing mail judgment processing comes to an end, and normal mail relaying is carried out.

If any entry matching the search conditions is found in step 610, program control goes to step 611. In step 611, entries that have exceeded a predetermined period of validity are excluded by checking the date and time registered 404. In step 612, entries not meeting the relevant transmission source mail address are excluded by checking the transmission source mail address 405.

Note that step 612 is intended for increasing the degree of accuracy in fault-inducing mail judgment through conditional combinations with characteristics extracted in the preceding steps. In step 612, there may also be provided a modified arrangement wherein the characteristics extracted in the preceding steps are combined with other than transmission source mail address information. For example, in a situation where the mail gateway 106 is arranged to manage mail characteristics by using hash values, there is a possibility that the characteristics of different mails may have the same hash vale. Hence, the degree of accuracy in fault-inducing mail judgment (probability of detection of fault-inducing mail) can be made higher by excluding entries not meeting the relevant transmission source mail address even if the same hash value is given to the mail characteristics.

In step 613, it is checked whether any entry matching the search conditions is indicated as in the case of step 610. If any entry matching the search conditions is indicated in step 613, it is judged that the mail concerned is a fault-inducing mail. If no entry matching the search conditions is indicated, it is judged that the mail concerned is not a fault-inducing mail, and thus the fault-inducing mail judgment process comes to an end. In step 613, a plurality of entries matching the search conditions may be found. The details of this situation will be presented later in the description of fault-inducing mail countermeasure selection 615 (detailed with reference to FIG. 7).

In step 614, the number of entries matching the search conditions found in step 613 is added to the fault-inducing mail reception count 411.

Steps 615 to 618 are performed in a case where the mail concerned is judged to be a fault-inducing mail. In step 615, a countermeasure against a fault-inducing mail is selected. More specifically, in the processing of fault-inducing mail countermeasure selection, the mail gateway 106 selects one of the three countermeasures shown in FIG. 5 according to the fault-inducing mail information table 321; error reply 519, notification of non-delivery 522, and transcoding skip-over 525. The details of the fault-inducing mail countermeasure selection will be described later with reference to FIG. 7. If the result of step 615 indicates an error reply, program control goes to step 616. If the result of step 615 indicates a notification of non-delivery, program control goes to step 617. If the result of step 615 indicates a faulty point skip-over, program control goes to 618.

In step 616, the mail gateway 106 returns an error reply to the mail client 110, and then terminates the fault-inducing mail judgment processing. In step 617, the mail gateway 106 terminates the fault-inducing mail judgment processing, and proceeds to transmission of a notification of non-delivery. Then, the mail gateway 106 returns a normal reply 521 to the mail client 110 and a notification of non-delivery 522 thereto through a coupling different from that for the normal reply. Although not described regarding the embodiment, a notification of non-delivery may be sent to the destination mail server 111 in addition to the notification of non-delivery 522 returned to the mail client 110.

Steps 618 and 619 are performed in a case where a faulty point is to be skipped over. In step 618, an error statement to be added to the body of the mail concerned is selected. Thus, a mail recipient is informed that the processing to be taken under normal condition has not been carried out due to skipping over a faulty point. In a situation where image processing conversion is skipped over, an error statement or another image file may be added instead of the image concerned in step 618. In step 619, faulty point information is set as a flag in the mail management information 324. After step 619, the fault-inducing mail information judgment processing come to an end.

On completion of the fault-inducing mail judgment processing, the mail relaying process 312 in the mail gateway 106 skips over a faulty point as indicated at step 525 in FIG. 5. Before sending each mail to the destination mail server, the mail relaying process 312 in the mail gateway 106 carries out header filtering (510, 524), transcoding (512), and image file conversion (526) under normal condition. For these processing operations, respective functions are implemented in the mail gateway 106. The input and output of each function are designed to prevent influence of another function, i.e., each function is so arranged as to allow independent implementation. For example, each function is designed so that image file conversion can be carried out independently regardless of execution/non-execution of header filtering and transcoding. In the design arrangement thus made, it is possible to perform a faulty point skip-over for each of the above processing operations.

Before invoking each function for mail transmission processing, the mail gateway 106 checks whether the skip processing flag for a faulty point is set in the mail management information 324. If the skip processing flag is set, a call of the relevant processing function is skipped over, and program control proceeds to invocation of the next processing function. For example, in transcoding skip-over (525), the mail gateway 106 checks whether the skip processing flag for transcoding is set in the mail management information 324. If the skip processing flag is set, a call of the processing function for transcoding is skipped over, and program control proceeds to invocation of the next processing function for image file conversion (526). As a modified form for faulty point skip-over, there may be provided such an arrangement that, if the skip processing flag for a faulty point is set in the first step of each processing function, the subsequent flow of the function is skipped over and program control proceeds to the next processing function.

Figure 7:
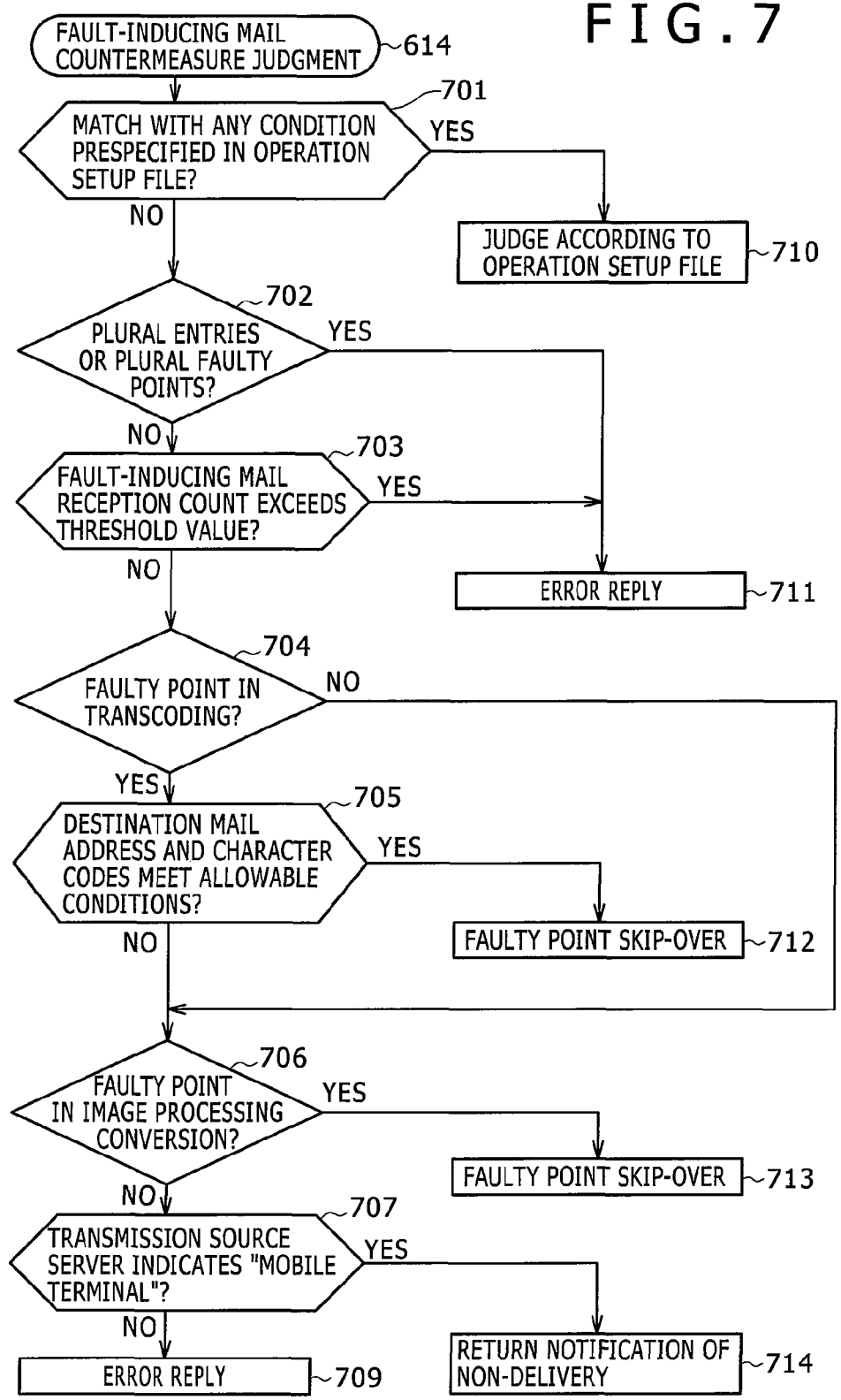
FIG. 7 illustrates a processing flow for fault-inducing mail countermeasure selection in the mail gateway.

Referring to FIG. 7, there is shown a processing flow for the fault-inducing mail countermeasure selection 615.

This processing flow is taken in the mail gateway 106 to select a countermeasure against a fault-inducing mail recognized in the fault-inducing mail judgment or fault-inducing mail detection (to be described in detail later with reference to FIG. 8). In the mail gateway 106, one of the following three countermeasures is selected; error reply, notification of non-delivery, and faulty point skip-over.

The processing of fault-inducing mail countermeasure selection/judgment is advantageous in a situation where a recipient wants to receive a fault-inducing mail as an ordinary mail, i.e., where a fault-inducing mail is non-malicious. In such a situation, it is most preferable that the mail gateway 106 should relay a non-malicious fault-inducing mail while skipping over the relevant faulty point. For example, in case that a faulty point is in transcoding, a possible fault in the mail gateway 106 can be avoided without giving any adverse effect to a recipient if the relevant transcoding is performed in a destination mail server of a reliable communication carrier.

Further, a notification of non-delivery can be provided to a sender and/or a recipient in the form of mail containing fault conditions. The processing of error reply is selected at the time of rejection of processing of the mail concerned, i.e., an error reply is provided when neither of the above two processing operations (faulty point skip-over, and notification of non-delivery) is selected. In case of decoupling as in fault-inducing mail detection processing to be described with reference to FIG. 8, the mail concerned may be deleted without transmission of an error reply.

With reference to FIG. 7, the following will then describe the details of fault-inducing mail countermeasure judgment/selection.

In step 701, it is checked whether there is a match with any condition prespecified in an operation setup file for the mail gateway 106. The operation setup file contains conditional information corresponding to the respective items of the fault-inducing mail information table 321, and describes which countermeasure should be selected when there is a match with a particular condition. According to the operation setup file, the mail gateway 106 judges whether the mail concerned has a match with any condition prespecified therein (step 710).

The result of judgment in step 710 indicates one of at least three countermeasures; error reply, notification of non-delivery, and faulty point skip-over. In a modified arrangement, other countermeasures than these three countermeasures and particular processing specifications for respective judgment results may be added to the operation setup file. For example, a judgment for a combinational countermeasure of notification of non-delivery and faulty point skip-over may be specified in the operation setup file.

As mentioned above, it is allowed to customize the processing of fault-inducing mail countermeasure judgment/selection by using steps 701 and 710.

In step 702, it is checked whether a plurality of entries are contained in the fault-inducing mail information table 321 or a single entry is contained with a plurality of faulty points 410. If there is a match with either of these conditions, program control goes to the processing of error reply (step 711).

In step 703, it is checked whether the fault-inducing mail reception count 411 exceeds a prespecified threshold value. If the threshold value prespecified for the fault-inducing mail reception count 411 is exceeded, it is presumable that the mail concerned is a common-type spam mail intended for large-quantity distribution in most cases. Therefore, program control goes to the processing of error reply (step 711).

In step 704, it is checked whether a faulty point is in transcoding.

In step 705, it is checked whether the destination mail address 407 and the character codes of the mail concerned meet conditions allowable for transmission without transcoding. If the conditions allowable for transmission without transcoding are met, program control goes to the processing of faulty point skip-over (step 712).

For explanation of steps 705 and 712, the relationship of destination mail addresses, character codes, and transcoding is described below. In mail gateway 106, transcoding varies depending on the state of the destination mail address 407. If the destination mail address 407 belongs to the wireless network 102 and the carrier facility network 103 (carrier's own network) that are under the management of a mobile phone carrier running the mail gateway 106 according to the embodiment, the mail gateway 106 performs transcoding so that the mail concerned will be displayed normally at the communication terminal of the mobile phone carrier.

If the destination mail address 407 belongs to a different communication carrier (different mobile phone carrier) and a pre-agreement has been made on mail character codes, the mail gateway 106 performs transcoding specific to the communication carrier. For example, pictographic character codes unique to a particular mobile phone carrier are subjected to mutual transcoding in communication between mobile phone carriers. In one case of pre-agreement on mail character codes, it may be stipulated that transcending by the mail gateway 106 is a mandatory condition; in the other case thereof, it may be stipulated that transcoding by the mail gateway 106 is a recommended condition. In the latter case, the ISO-1022-JP (JIS) coding scheme to be described later may be used for transmission.

If the destination mail address 407 belongs to a different mobile phone carrier and no pre-agreement has been made on mail character codes, the mail gateway 106 performs transcoding to the ISO-2022-JP (JIS) scheme which is a standard mail character coding scheme for the Japanese language. It is to be noted, however, that mail transmission in other than the ISO-2022-JP (JIS) scheme is also applicable. In most mail software programs other than those for mobile phones, the Unicode scheme is supported for mailing.

Further, in some mobile phone carriers, transcoding is performed at the time of mail reception. It is not required for the mail gateway 106 to perform transcoding in such a case.

Based on the background mentioned above, conditions allowable for transmission without transcoding by the mail gateway 106 are specified in step 705. In step 705, the result of judgment is "NO" if the destination mail address 407 belongs to a network other than that of the relevant communication carrier running the mail gateway 106 or if the destination mail address 407 indicates a destination for a network of a communication carrier having a pre-agreement that only transcoded mails are acceptable. Alternatively, the result of judgment is "YES" if the destination mail address 407 has any other condition than the above or if the mail concerned conforms to the ISO-2022-JP (JIS) scheme.

Further, the result of judgment in step 705 is also "YES" if the destination mail address 407 indicates a destination for a network of a communication carrier in which transcoding is performed at the time of mail reception. Still further, there may be provided such an arrangement that "YES" is provided in the result of judgment in step 705 if the destination mail address has any other conditions than the above and indicates a destination for a network of other than a mobile phone carrier and also the mail concerned conforms to the Unicode scheme.

In step 706, it is checked whether a faulty point is in image processing conversion. If the image processing conversion is faulty, program control goes to the processing of faulty point skip-over (step 713). Since a mail may be transmitted even if image processing conversion is not performed, the faulty point is skipped over.

In step 707, it is checked whether the transmission source server 406 indicates "Mobile terminal". If this condition is met, program control goes to the processing of notification of non-delivery (step 714); otherwise, program control goes to the processing of error reply (step 709). In a situation where the mail client 110 is a mobile terminal, even if the mail gateway 106 returns an error reply to the mobile terminal, the cause of an error in mail transmission or detailed information thereof may be unknown to the user of the mobile terminal, though depending on the design specifications thereof. Hence, in steps 707 and 714, in the case where the mail concerned has been sent from a mobile terminal, the mail gateway 106 returns a notification of non-delivery describing the details of the error concerned to the mobile terminal.

Figure 8:
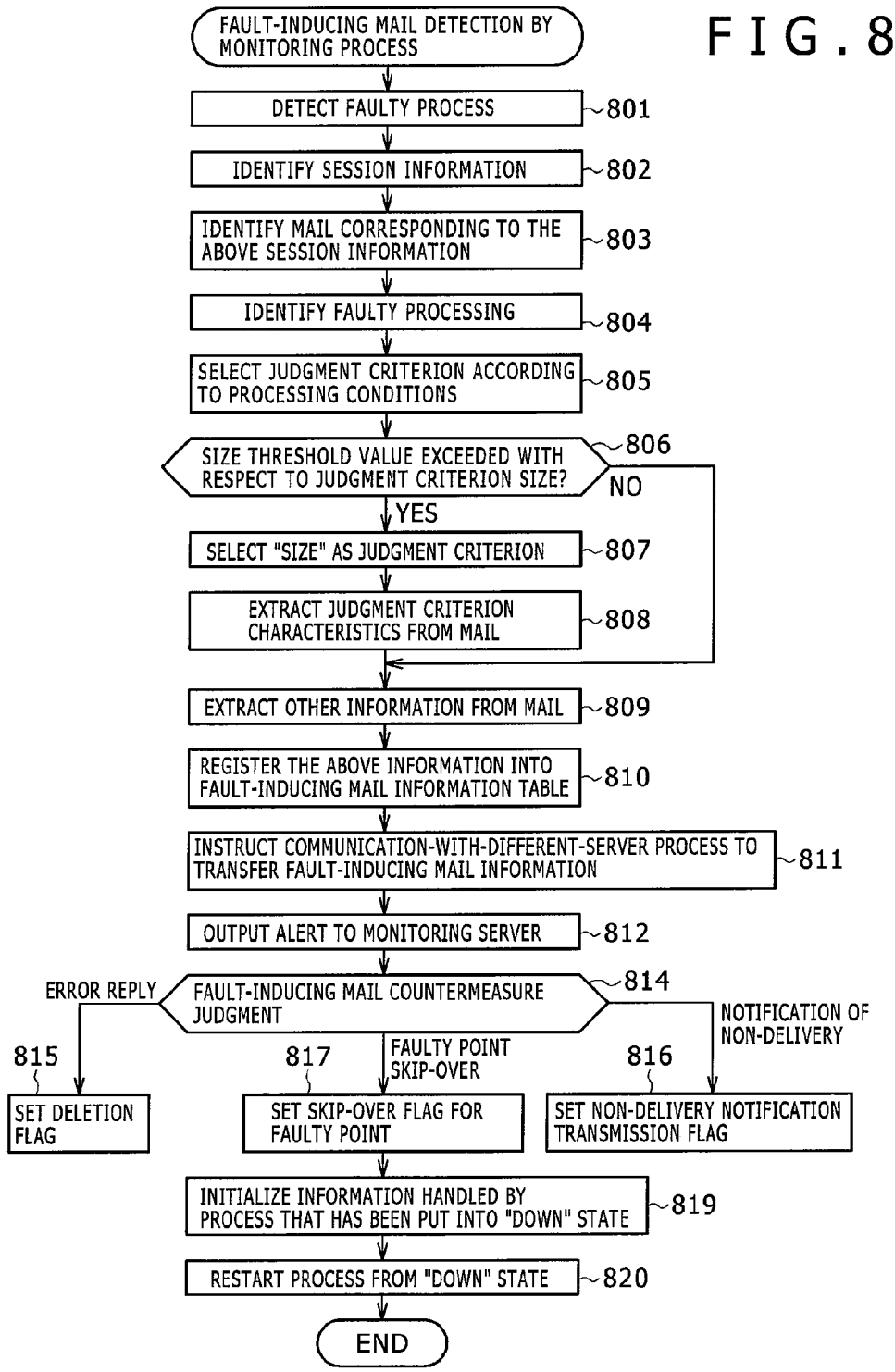
FIG. 8 illustrate a processing flow for fault-inducing mail detection in the mail gateway.

Referring to FIG. 8, there is shown a processing flow for the fault-inducing mail detection 513 to be carried out by the monitoring process 313.

On occurrence of a fault in the mail gateway 106, a fault-inducing mail that has caused the fault is identified, and information regarding the fault-inducing mail, relevant process, and faulty point is collected. The information thus collected is registered into the fault-inducing mail information table 421.

First in the fault-inducing mail detection, the monitoring process 313 detects a fault or a faulty process that has encountered the fault (step 810). In step 801, the monitoring process 313 can issue a signal indicating that a process under supervision has been put into a "down" state, or the monitoring process 313 can detect a fault according to the occurrence of a timeout in processing. For implementation of step 801, there may also be provided such an arrangement that a process under supervision periodically reports a normal state thereof to the monitoring process 313, and that the monitoring process 313 recognizes the occurrence of a fault when the updating by the process under supervision is halted.

Then, the monitoring process 313 identifies session information 323 corresponding to the occurrence of the fault concerned (step 802). For identifying session information 323 corresponding to the occurrence of the fault concerned in step 802, any of such methods as mentioned below can be implemented: The monitoring process 313 holds a pointer indicating session information 323 in the course of processing by the mail relaying process 312, the monitoring process 313 holds an identifier (ID number) of session information 323 in the course of processing by the mail relaying process 312, or the monitoring process 313 records a pointer or ID number of session information 323 in the course of processing by the mail relaying process 312 into the shared data 316.

Then, the monitoring process 313 identifies a mail 325 corresponding to the above session information 323 (step 803). In step 804, based on the above session information 323, it is identified which processing, e.g., header filtering or transcoding, has encountered the fault. In step 805, a judgment criterion is identified according to the processing conditions. Judgment criteria are the same as information to be stored at the judgment criterion item 409 of the fault-inducing mail information table 321 in step 810 to be taken later. For example, "Header" is selected in the event of a fault in header filtering, or "Body" is selected in the event of a fault in mail body transcoding. In step 806, with respect to the judgment criterion size, e.g., "Header size" corresponding to a faulty point, or "Body size" corresponding thereto, it is checked whether a prespecified size threshold value is exceeded or not. If the prespecified size threshold value is exceeded with respect to the judgment criterion size, the item "Size" is selected as a condition for use in judgment (step 807).

The monitoring process 313 extracts judgment criterion characteristics from the mail 325 (step 808), and then from the mail 325 and mail management information 324, the monitoring process 313 also extracts the transmission source mail address, transmission source server, destination mail address, size, and other information than the judgment criterion information (step 809). Thus, the monitoring process 313 registers information acquired through steps 801 to 809 into the respective items of the fault-inducing mail information table 321.

In step 811, the monitoring process 313 instructs the communication-with-different-server process 315 to transfer fault-inducing mail information. Note, however, that this processing is not performed where only one mail gateway server 106 is provided. In step 812, an alert indicating the occurrence of the fault is output to the monitoring server 108.

Step 814 is provided to perform the fault-inducing mail countermeasure judgment described with reference to FIG. 7. If the result of judgment in step 814 indicates an error reply, the monitoring process 313 sets a deletion flag in the mail management information 324 to delete the mail that has caused the fault (step 815). For the mail for which the deletion flag thereof has been set, after recovery of the process concerned from the "down" state, e.g., after recovery of the mail relaying process 312 from the "down" state (step 820), deletion is carried out by the mail relaying process 312. The deletion flag is thus set in step 815 since the mail gateway 106 cannot return an error reply due to decoupling between the mail gateway 106 and the mail client 110 at the time point of step 814.

If the result of judgment in step 814 indicates a notification of non-delivery, the monitoring process 313 sets a non-delivery notification flag in the mail management information 324 to provide a notification of non-delivery (step 816). If the result of judgment in step 814 indicates a faulty point skipover, the monitoring process 313 sets a skip-over flag in the mail management information 324 to perform skipping over the faulty point (step 817). For the mail corresponding to the flag that has been set in step 816/817, the relevant processing is carried out after recovery of the process concerned from the "down" state (step 820) as in the case of step 815.

Then, the monitoring process 313 initializes the session information 323 and other information handled by the process that has been put into the "down" state (step 819). After this initialization, the monitoring process 313 restarts the process for recovery from the "down" state (step 820).

Although not shown in the accompanying drawings concerning the embodiment, the mail gateway 106 may store mails received from the mail client 110 into a queue on a memory or storage disk in some applications. In cases where mails are stored into the queue for management in the mail gateway 106, after a process is suspended due to the occurrence of a fault therein, each of the mails may be taken out of the queue by the process at the time of recovery from the fault. The re-processing of the mail taken out of the queue may result in the recurrence of the fault. In the fault-inducing mail detection processing shown in FIG. 8, a step for removing mails from the queue is provided additionally for preventing the recurrence of the fault.

While the embodiment has been described as related to application to the mail gateway 106, faulty events in mail reception that can be solved in the embodiment may take place in any kind of mail receiving server such as the mailbox server 107. Hence, the embodiment is applicable to any kind of mail receiving server to obtain the same advantageous effects as those in application to the mail gateway 106.

The mail gateway 106 and the mailbox server 107 differ in processing as mentioned below. While the mail gateway 106 sends mails to the destination mail server 111, the mailbox server 107 stores mails into a nonvolatile memory area such as that in a storage disk. Hence, in cases where the embodiment is applied to the mailbox server 107, there may be provided such an arrangement that a processing operation for mail storing into a nonvolatile memory area is performed in lieu of a processing operation for mail transmission to the destination mail server 111 (steps 527 and 528 in FIG. 5).

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A mail gateway for receiving mail from a mail client, the mail gateway being configured to implement processes comprising:
   a mail relaying process in charge of mail relaying operations implemented through program execution; and
   a monitoring process for supervising the mail relaying process, wherein:
   the mail relaying process includes at least one processing arrangement for handling the mail,
   the monitoring process supervises whether any fault has occurred in the at least one processing arrangement included in the mail relaying process,
   upon detection of a fault, information identifying a fault-inducing mail that has caused the fault and a faulty point corresponding to the occurrence of the fault are recorded into an information table,
   for a new arriving mail to be handled, the mail relaying process searches the information table according to pre-specified search conditions, and if a match with an entry recorded in the information table is found, the new arriving mail is judged to be a fault-inducing mail, and in accordance with the contents of the information table and pre-specified processing conditions, a pre-avoidance processing is carried out as a countermeasure against the fault,
   an operation setup file contains conditional information corresponding to respective items of the information table and each countermeasure to be taken when a match with a particular condition is found, and in the pre-avoidance processing to be taken as a countermeasure against the fault, the mail relaying process selects a countermeasure in accordance with the operation setup file, in case that there is no match with any condition pre-specified in the operation setup file and the fault-inducing-mail meets a plurality of entries recorded in the information table or the fault-inducing-mail has a plurality of faulty points, the mail relaying process returns an error reply or a notification of non-delivery to the mail client, in case that the error reply or the notification of non-delivery is not returned to the mail client, depending on a processing function that has encountered the fault, the mail relaying process examines whether the processing function that has encountered the fault should be skipped or not, and the mail relaying process, if it is judged that the processing function should be skipped, skips over the processing function, and in case that a skip-over of the processing function is not made, the mail relaying process returns a notification of non-delivery to the mail client if the mail client is pre-specified or an error reply to the mail client if the mail client is not pre-specified.

2. The mail gateway according to claim 1, wherein:
in searching the information table according to the pre-specified search conditions, if it is found that the characteristics of a mail header and/or body meet the characteristics of mail information recorded in the information table, the mail relaying process judges that there is a match with an entry in the information table.

3. The mail gateway according to claim 2, wherein:
the characteristics of the mail header and/or body include conditional information indicating that a pre-specified threshold value is exceeded with respect to the size of the mail header and/or body and that there is a match with mail size data recorded in the information table.

4. The mail gateway according to claim 1, wherein:
the monitoring process extracts the characteristics of the mail that has been judged to be a fault-inducing mail, to indicate faulty point information, the monitoring process judges which one of the mail header and body has caused the fault and which processing function has encountered the fault, and the monitoring process records the mail characteristics thus extracted and the faulty point information thus indicated into the information table with mutual association therebetween.

5. The mail gateway according to claim 1, wherein:
the monitoring process determines a countermeasure processing to be taken against the fault for the mail that has caused the fault, and carries out the countermeasure processing after completion of recovery processing for the faulty point corresponding to the occurrence of the fault.

6. The mail gateway according to claim 5, wherein:
in the countermeasure processing, the fault-inducing-mail is deleted, or a processing function that has encountered the fault or a processing function that is likely to encounter a fault is skipped over, and at the time of deletion of the fault-inducing-mail, an error reply or a notification of non-delivery is returned to the mail client.

7. The mail gateway according to claim 1, wherein:
in the pre-avoidance processing, the fault-inducing-mail is deleted, or a processing function that has encountered the fault or a processing function that is likely to encounter a fault is skipped over, and at the time of deletion of the mail concerned, an error reply or a notification of non-delivery is returned to the mail client.

8. The mail gateway according to claim 7,
wherein the mail replying process provides a description of an error condition in the notification of non-delivery.

9. The mail gateway according to claim 1,
wherein the mail relaying process provides a description of an error condition in the notification of non-delivery.

10. The mail gateway according to claim 1, wherein the fault is judged to be a function for transcending or image processing conversion.

* * * * *